United States Patent [19]

Millar

[11] Patent Number: 5,052,204

[45] Date of Patent: Oct. 1, 1991

[54] SECURITY DEVICE

[76] Inventor: Frederick W. Millar, 3 Fenton Crescent, Frankston, Victoria 3199, Australia

[21] Appl. No.: 477,962

[22] PCT Filed: Dec. 2, 1988

[86] PCT No.: PCT/AU88/00468
§ 371 Date: Jul. 26, 1990
§ 102(e) Date: Jul. 26, 1990

[87] PCT Pub. No.: WO89/05251
PCT Pub. Date: Jun. 15, 1989

[30] Foreign Application Priority Data

Dec. 3, 1987 [AU] Australia .................. PI5731
Jul. 29, 1988 [AU] Australia .................. PI9549

[51] Int. Cl.⁵ ............................................. E05B 65/12
[52] U.S. Cl. ........................................ 70/256; 70/237
[58] Field of Search .............. 70/243, 242, 256, 257, 70/237, 258

[56] References Cited

U.S. PATENT DOCUMENTS

| 1,060,239 | 4/1913 | Empey | 70/242 |
| 1,282,067 | 10/1918 | Gohring | 70/242 |
| 1,475,275 | 11/1923 | Bowman | 70/242 |
| 1,570,797 | 1/1926 | Thomas | 70/256 |
| 1,696,957 | 1/1929 | Jacobi | 70/256 |
| 3,747,378 | 7/1973 | Hiatt | 70/257 |
| 4,683,735 | 8/1987 | Magrobi | 70/168 |

Primary Examiner—Robert L. Wolfe
Attorney, Agent, or Firm—Armstrong, Nikaido, Marmelstein, Kubovcik & Murray

[57] ABSTRACT

A security device for an internal combustion engine comprising a valve for installation in either the air inlet, fuel inlet or exhaust outlet of the engine, and a lockable valve control mechanism. When installed, the valve is operable from within the cabin of the vehicle by means of the valve control mechanism to open or close the valve. The valve control mechanism can be locked with the valve in the closed position so that when a thief attempts to start a car in which the device is installed, the engine won't start or if it does it won't run for long.

10 Claims, 7 Drawing Sheets

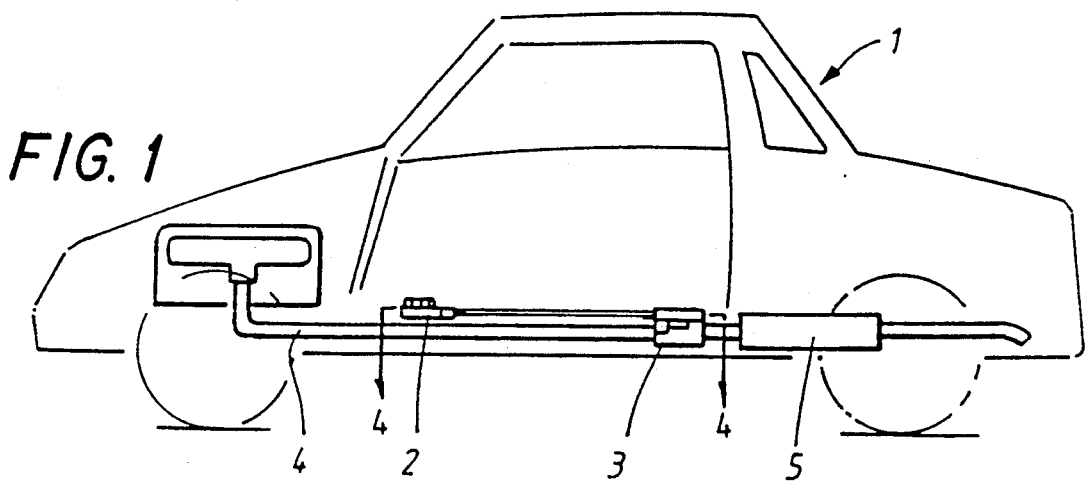
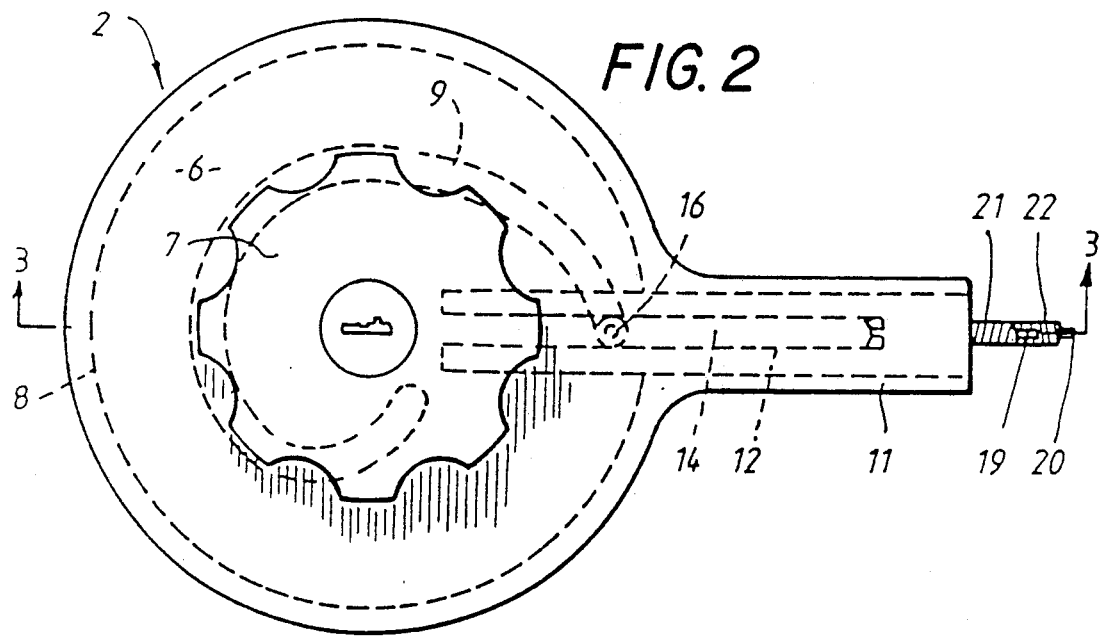
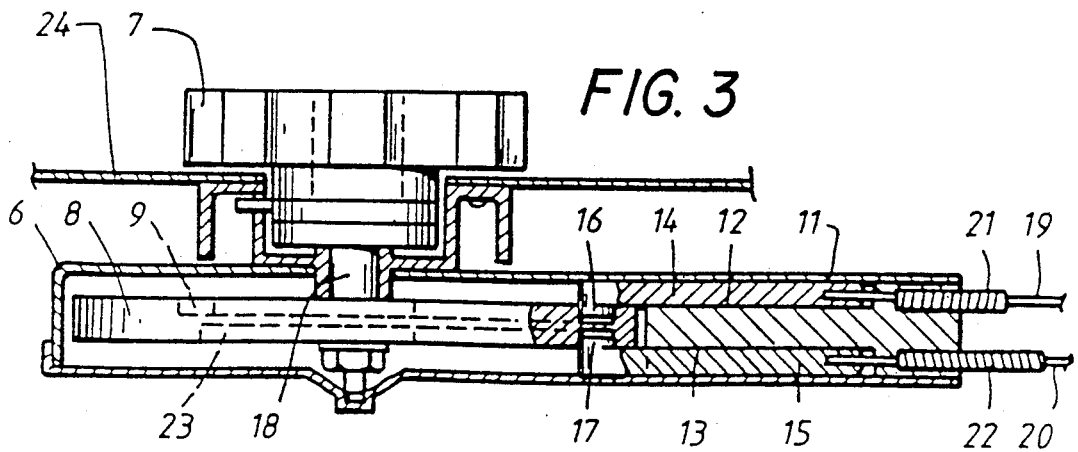

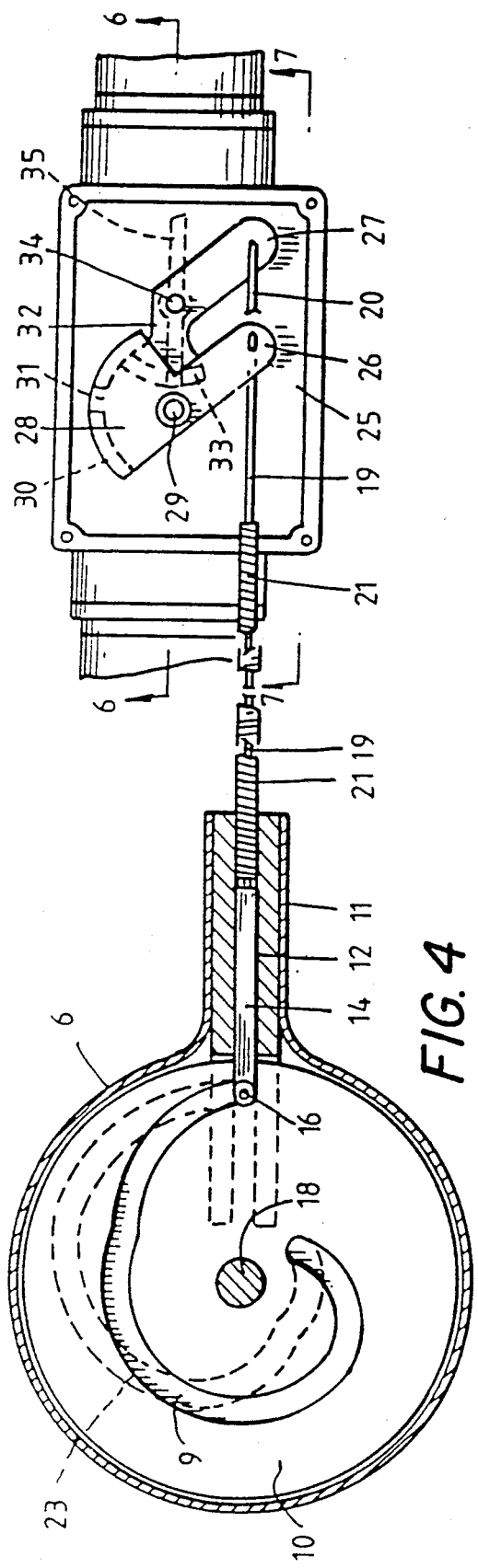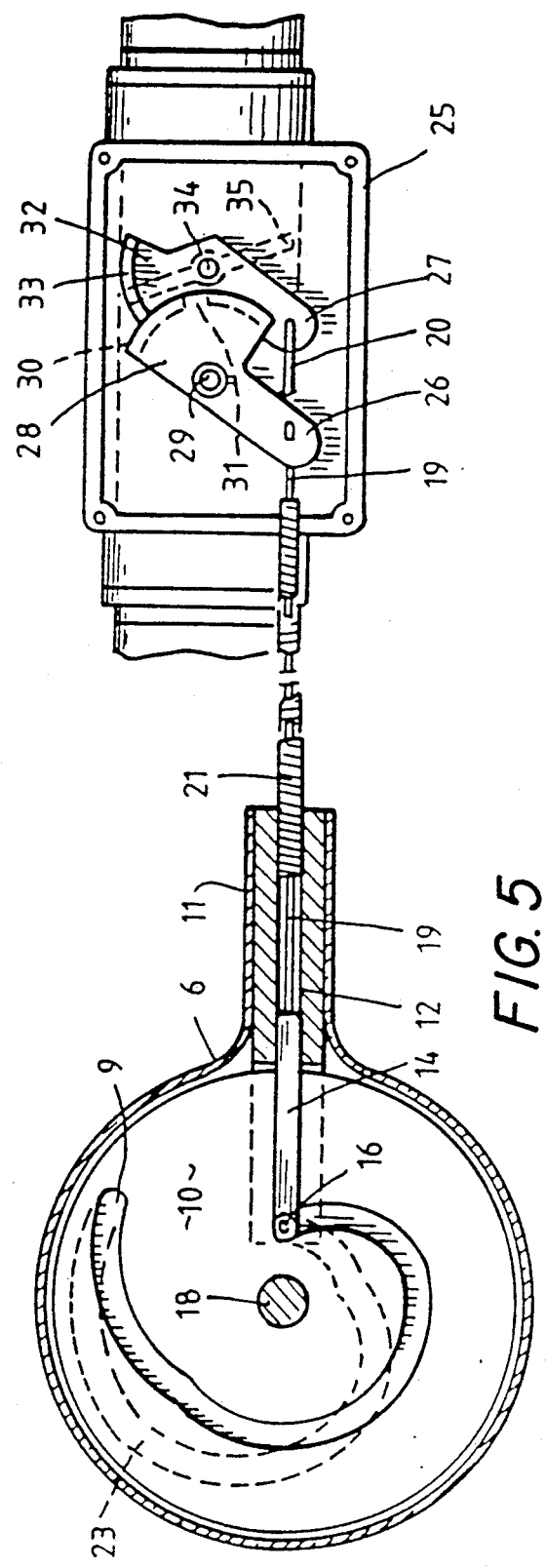

SECURITY DEVICE

The present invention concerns security devices for preventing the unauthorised operation of internal combustion engines.

The organized theft of motor vehicles has become endemic in most western countries. Most anti-theft devices currently on the market are, in fact, alarms. Some of these alarms suffer from being activated by car phones, two-way radios and the like. To be effective, alarms also rely on the intervention of third parties when an alarm goes off. In modern society there is a growing reluctance for third parties to act to protect the property of others. Furthermore, alarms are only effective against inexperienced thieves. Experienced thieves are able to deactivate the alarms before starting the car and harmlessly driving away. In many western countries substantial income has been earned by organized thieves who steal cars, take them to a safe garage, strip them and sell the parts to wreckers yards.

In order to provide a device that is more effective against such organized thieves, exhaust pipe caps have been developed which can be placed in position to effectively block the exhaust pipe thereby preventing the motor from running for long even if it is possible to get it started. U.S. Pat. No. 4,683,735 describes such a cap. U.K. Patent No. 2,193,531 describes a device having a lockable insert that can be fitted onto the end of an exhaust pipe. The insert blocks the exhaust pipe when in place. Both these devices however are located at a point in the exhaust system that is easy for a thief to attack and remove the device.

An object of the present invention is to provide an immobilizing device for a motor vehicle that is more difficult to remove.

Accordingly, the present invention provides a security device for an internal combustion engine having an exhaust outlet, said device comprising a valve mechanism for the exhaust outlet, valve control means for operating the valve mechanism and means for locking the valve control means, said valve mechanism being capable when installed and operated, of closing the inlets or outlet in which it is installed.

Provision of a valve control means enables the device installed to be operated any number of times. However the devices of the prior art require installation and removal each time the driver leaves the car and returns respectively.

Preferably the valve has a first member having a gate and a second member which is connected to the valve member and is capable of passing through the gate when it is in the open position to cause the valve member to move to an open or closed position but is incapable of passing through the gate when it is in the closed position thereby locking the valve member in the open or closed position, the valve control mechanism being connected to the first and second members such that it is capable of causing the gate of the first member to open or close and the second member to move through the gate when it is open.

In a preferred embodiment of the invention the first member comprises a rotatable lever having a head with a skirt depending therefrom, the skirt having a gap therein to define a gateway, the lever being rotatable about an axis and the second member comprises a rotatable lever having a head with a skirt depending therefrom in a direction opposite to the skirt of the second member and rotatable about an axis parallel to the axis of the first member such that when the first member is located with its gate in the open position, the skirt of the second member can pass through the gateway and when the first member is located in the closed position the skirt of the second member engages the skirt of the first member thereby preventing rotation of the second member.

In a further embodiment of the invention, the valve control mechanism comprises a housing, a rotatable disc attached to one end of an axle, a lockable rotatable control knob attached to the opposite end of the axle, a pair of slidable plates mounted inside the housing, each having one end of a pair of cables secured thereto, the cables being enclosed with sheaths, one end of each of which is secured to the housing, the rotatable disc having two cams depending therefrom on opposite sides thereof and parallel to the axis of rotation, the rotatable disc being mounted between the slidable plates within the housing, each of said plates having one end so shaped that it is capable of co-operating with each of the cams to pull or push the cables, the other ends of each of said cables being attached to an end of the first and second members such that the first and second members may be rotated by rotation of the lockable rotatable control knob.

It will be understood that in this form of the control mechanism the sheath ensures that the pushing and pulling actions induced by the cam are not wasted in merely bending and unbending the cables.

Preferably the valve is adapted to be located in the exhaust pipe upstream of the muffler. The exhaust pipe is strongest at this point and its location there ensures that the back pressure which builds up when the motor is started with the valve closed does not simply burst the muffler but causes the motor to stop. Locating the valve upstream of the muffler also means that if the exhaust pipe is cut in order to remove the valve, the engine will make a good deal of noise.

Preferably the valve control mechanism is located in a console under the cabin of a vehicle to which the device is attached.

The lockable rotatable control knob may comprise a first cylinder having a central bore within which a second hollow cylinder is mounted which provides a sleeve for a third cylinder mounted therein which by means of a key operated cam is rotatable to cause a lug to engage or disengage a co-operating slot within the housing in which the knob is rotatably mounted such that when the lug engages the slot, the knob can no longer be rotated and when the lug is disengaged the knob can be rotated within the housing.

The lockable rotatable control knob may also be connected to the ignition system of the internal combustion engine in such a way that when the lug reaches the end of its travel and engages the slot, it also opens the ignition circuit thereby acting as a kill switch. Conversely when the lug disengages from the slot, the ignition circuit is closed and current is capable of flowing through the ignition system again.

The valve control mechanism may also comprise a key operable electrical switch and the first and second members may be operable by solenoids connected to the switch. In this embodiment the switch is moved to a first position which causes an electrical current to pass through a first solenoid which causes the first member to move to a position in which the gateway is open. Turning the switch to a second position causes an electrical current to activate a second solenoid which causes the second member to pass through the gateway thereby opening the valve.

The device may also be provided with a means for holding the valve in the closed position in the event that the valve control mechanism is severed from the valve.

Preferably the valve control mechanism is mounted within a console under the floor by means of thief-proof screws.

A preferred embodiment of the invention will now be described with reference to the accompanying drawings, wherein:

FIG. 1 is a side elevation partly in cross-section of a motor vehicle illustrating an embodiment of the invention installed in the vehicle;

FIG. 2 is a plan view partly in cross-section of a valve control mechanism;

FIG. 3 is a side elevation in cross-section of the valve control mechanism taken along line, 3—3 of FIG. 2;

FIGS. 4 and 5 are views taken along line 4—4 of FIG. 1, partly in cross-section illustrating the connections of the valve control mechanism to the first and second member of a valve mechanism located in the exhaust system;

Figure 6:
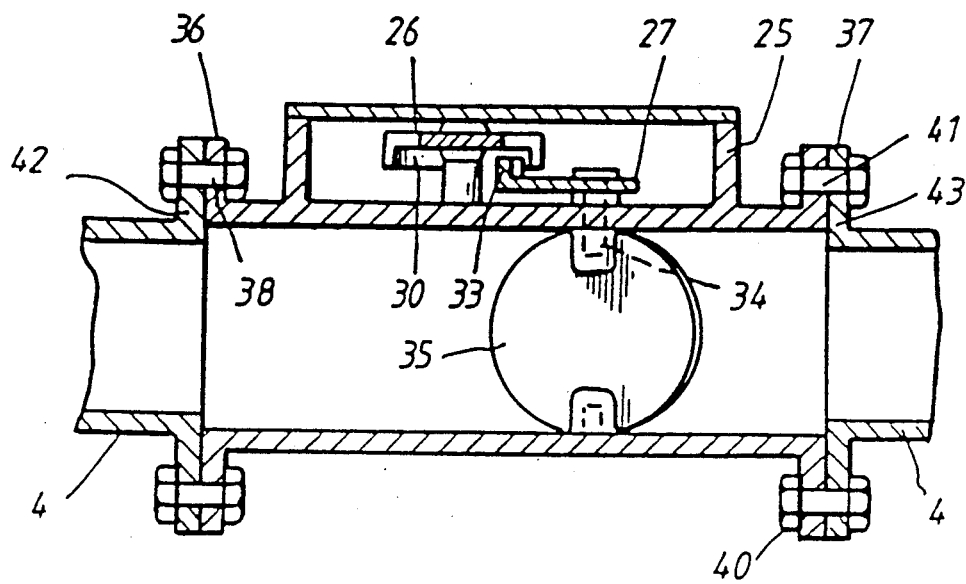
FIG. 6 is a cross-section along line 6—6 of FIG. 4.
Figure 7:
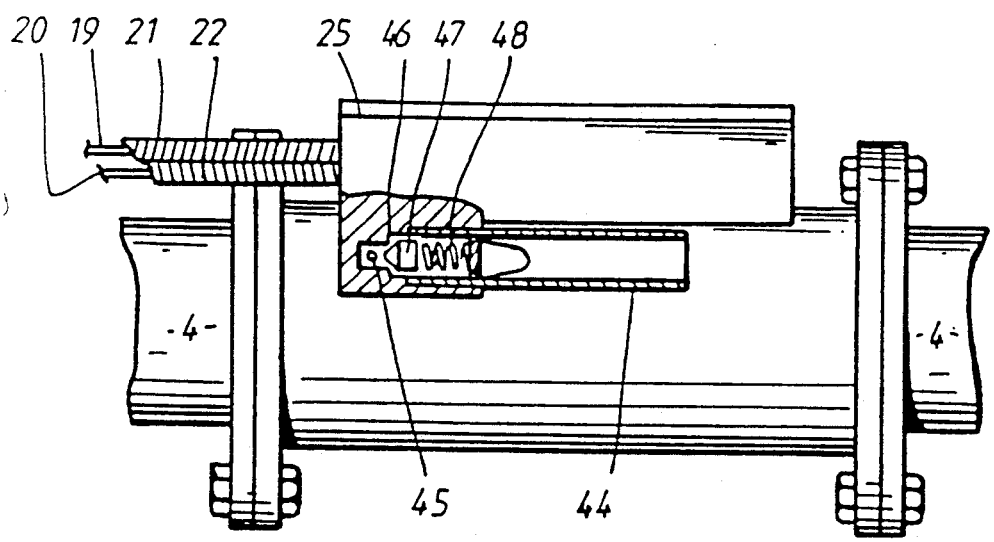
FIG. 7 is a cross-section along line 7—7 of FIG. 4.

FIG. 1 depicts a security device according to the present invention located within a motor vehicle 1. The security device comprises a valve 3 located upstream of the muffler 5 in the exhaust system 4 of the motor vehicle. The valve 3 is controlled by the valve control mechanism 2 located within the cabin of the motor vehicle 1.

FIG. 2 depicts the valve control mechanism 2 which comprises a housing 6, a lockable rotable knob 7 and a disc 8 connected to the lockable rotatable knob by an axle 18 (FIG. 3). The disc has a groove 9 in its top face 10 and another groove in its bottom face (not shown). The housing has a neck 11 with two internal longitudinal grooves one of which 12 is depicted in FIG. 2 and both of which are illustrated in FIG. 3 as items 12 and 13. The longitudinal grooves 12 and 13 have slidable connecting members 14 and 15. Each connecting member has an inwardly disposed cam 16 and 17 respectively at one end. The other end of each connecting member is attached to one end of cables 19 and 20 respectively. The cables are housed in sheaths 21 and 22 respectively, an end of each of which is in turn clamped into the neck 11 of the housing 6. The cams 16 and 17 are located in the grooves 9 and 23 of the disc 8. The valve control mechanism is mounted within a console 24 located under the cabin of the vehicle 1.

As depicted in FIGS. 4 and 5, the other ends of the sheaths 21 and 22 are clamped into a valve housing 25. The other ends of cables 19 and 20 are connected to an end of a first rotatable lever 26 and an end of a second rotatable lever 27 respectively. The other end of the first rotatable lever 26 comprises a head 28 with an arcuate shaped periphery with respect to its axis of rotation 29. The head has a skirt 30 depending inwardly from its arcuate periphery. The skirt has a gap 31 therein which defines a gateway. The other end of the second rotatable lever has a head 32 having an arcuate shaped periphery with respect to its axis of rotation. The head 32 has a skirt 33 protruding outwardly from its periphery. The second rotatable lever is mounted on one end of an axle 34, the other end of which is attached to a rotatable valve member 35 comprising a circular metallic disc seated in the valve housing 25 (FIG. 6). The valve housing 25 has flanges 36 and 37 having bolt holes 38, 39, 40 and 41 therein (FIG. 6) for securing the valve housing to corresponding flanges 42 and 43 in the exhaust system 4.

The valve housing 25 has a whistle 44 attached thereto. The whistle is connected to the interior of the housing by means of a bore 45 therethrough. The bore connects with a valve seat 46 having a valve member 47 biased against the seat by a spring 48.

When the car is in use, the valve member 35 is locked in the open position with its diameter parallel to the axis of the exhaust pipe (FIGS. 4 and 6). The disc valve member cannot move because the skirt 33 of the second rotatable lever 27 is prevented from moving by the skirt 30 of the first rotatable member 26. When the car is not in use the driver turns the rotatable knob 7 connected to the disc 8 by the axle 18 (FIG. 3). As the disc rotates the cam 16 located in groove 9 is drawn inwardly thereby drawing the cable 19 to the left (FIG. 4) and causing the first rotatable member 26 to rotate in a clockwise direction until the cam 16 reaches a point in the groove 9 where further rotation of the disc would cause the cam to move through a portion of the groove which forms an arc of a circle having the axle 18 as its centre. As the cam moves around the arc the connecting member 14 remains stationary as does the first rotatable member 26. Initially the cam 17 moves around an arcuate portion of the groove 23 as the disc is rotated and as a result the second rotatable member remains stationary up to the point where the cam 16 reaches the arcuate portion of the groove 9. At this point the gate 31 of the first rotatable member has moved to a position opposite to one end of the skirt 33 of the second rotatable member 27. At the same time the cam 17 moves into a portion of groove 23 which causes it also to be drawn inwardly thereby drawing cable 20 (FIGS. 3 and 4) towards the left, causing the second rotatable member to rotate in a clockwise direction, the skirt 33 to move through the gate 31 in the skirt of the first rotatable member and rotate the valve member 35 to the closed position. Further rotation of the knob 7 and disc 8 results in the cam 17 reaching another arcuate portion of the groove 23 while the cam 16 is again drawn inwardly by the groove 9 thereby causing the first rotatable lever 26 to again move in the clockwise direction and close the "gate" behind the skirt 33 of the second rotatable member 27 and locking it in position (FIG. 5). The rotatable knob 7 is then locked with a key to prevent it from being rotated by an unauthorised person.

When the driver returns the rotatable knob 7 is unlocked and rotated in a counterclockwise direction to reverse the procedure.

If an attempt is made to start the motor vehicle 1 while the valve 35 is closed, exhaust gases build up in the upstream portion of the exhaust system until the back pressure causes the motor to stop. At the same time some of the exhaust gases escape through the bore 45 by pushing the valve member 47 back from the valve seat 46 against the force applied by the spring 48. The escaping exhaust gases cause the whistle 44 to operate and raise the alarm.

A third sheathed cable can be provided that is connected to a spring loaded lever which when released while the valve is in the locked position would prevent the first rotatable member from being rotated. Cutting the third sheathed cable dureing an attempted theft, would release the spring thereby forcing the spring loaded lever to lock the valve member 35 in the closed position.

Preferably all three cables are located in the one sheath so that if the cables are cut the spring loaded lever is released.

Figure 15:
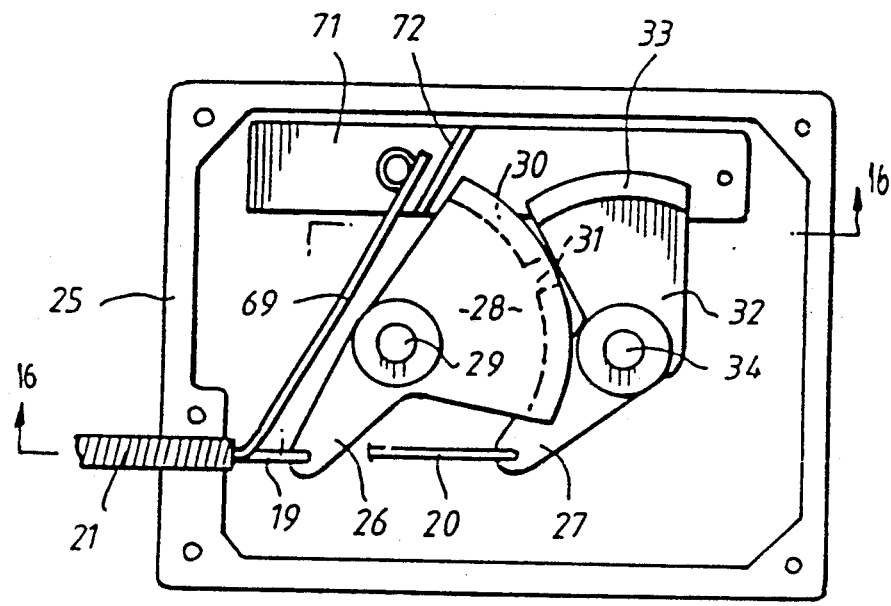
FIG. 15 is a plan view of an alternative form of valve mechanism.
Figure 16:
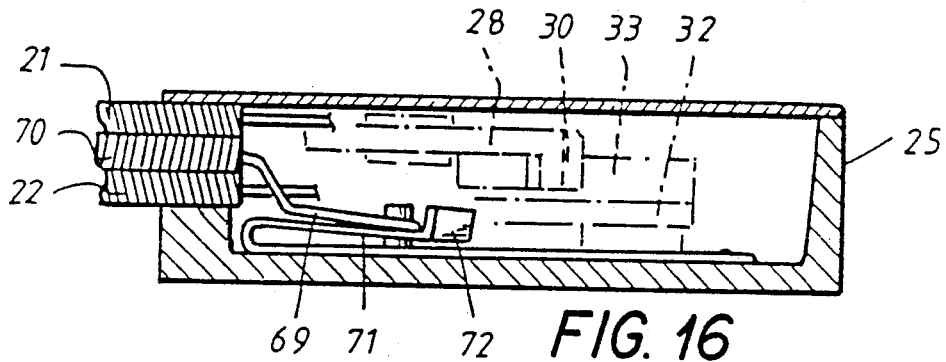
FIG. 16 is a cross-section taken along line 16—16 of FIG. 15.
Figure 17:
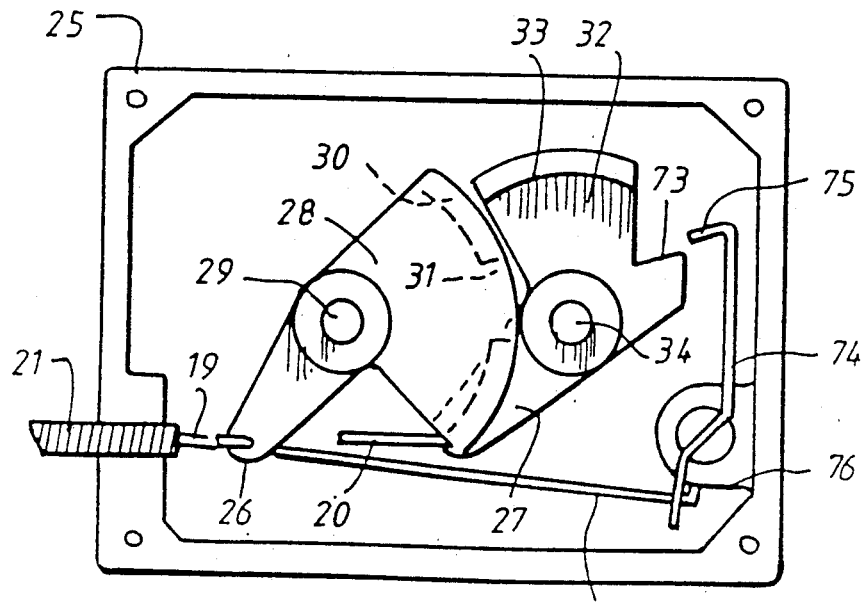
FIG. 17 is a plan view of another alternative form of valve mechanism.

FIGS. 15 to 17 illustrate two embodiments of the valve mechanism that function in the manner described above. FIG. 15 corresponds substantially with FIG. 4 with the exception that the valve mechanism illustrated in FIG. 15 contains a leaf spring 71 having a flange 72 at one end. The flange protrudes in a direction normal to the plane of the body of the spring and parallel to the axis of rotation of the first and second members 26 and 27 respectively. The flange is held down out of the way of the first and second members against the base of the housing 25 by one end of a cable 69 by means of torsional tension placed on the cable. Cable 69 is protected by sheath 70 and is clamped at its other end (not shown) in the neck 11 of the housing 6 in a state of torsional tension.

A thief not knowing which cable to cut in order to manually manipulate the valve mechanism, will cut all three. Alternatively all three cables are housed within the one sheath which ensures that a would be thief wishing to manually manipulate the valve mechanism would have to cut all three cables.

When cable 69 is cut, the torsional tension is relieved and the spring 71 is released causing flange 72 to move in a direction parallel to the axis of rotation of the first and second members 26 and 27 respectively thereby preventing rotation of the first member 26 and hence the second member 27 which, in turn, is connected to the valve member 35.

FIG. 17 illustrates a variation on this theme in which a spring 74 is held in position by the tension placed on cable 69. When that tension is released by cutting cable 69 the head 75 of spring 74 snaps into a position where it engages a corresponding lug 73 on the second member 27 thereby preventing it from being rotated.

Figure 8:
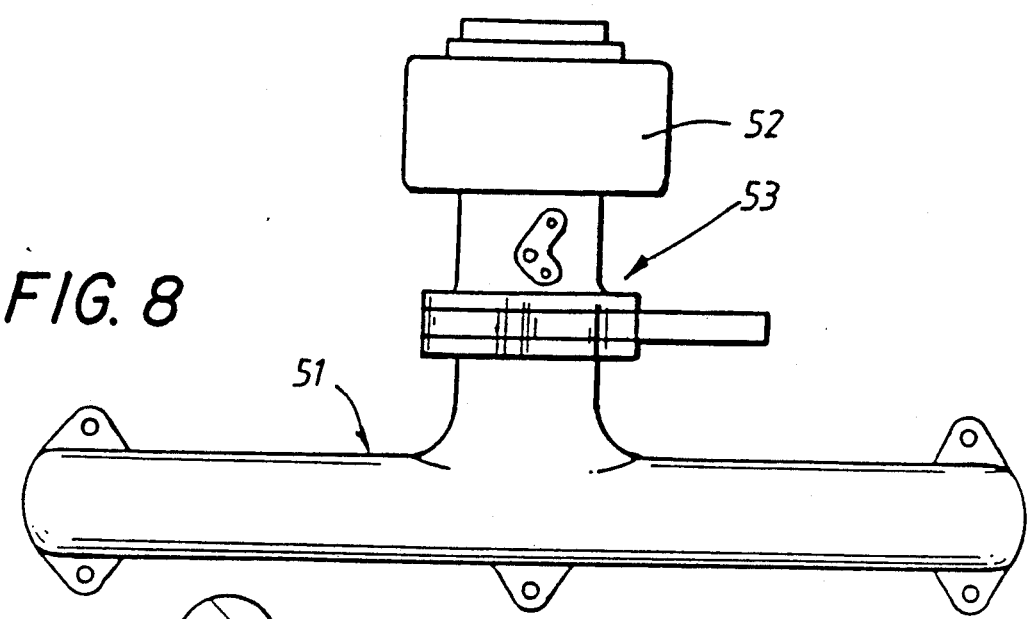
FIG. 8 is an alternative embodiment of a valve mechanism located in the air supply line.
Figure 9:
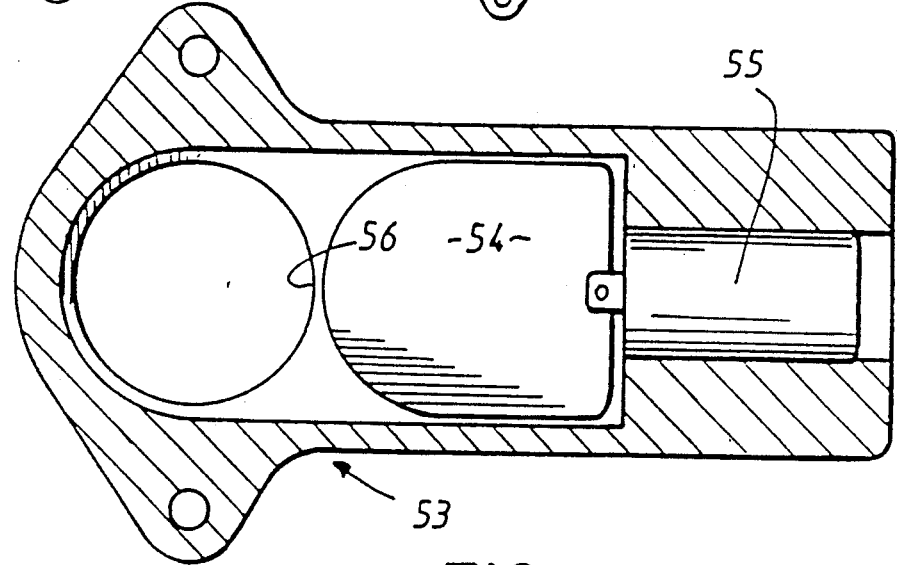
FIG. 9 is a plan view of the mechanism depicted in FIG. 8.
Figure 10:
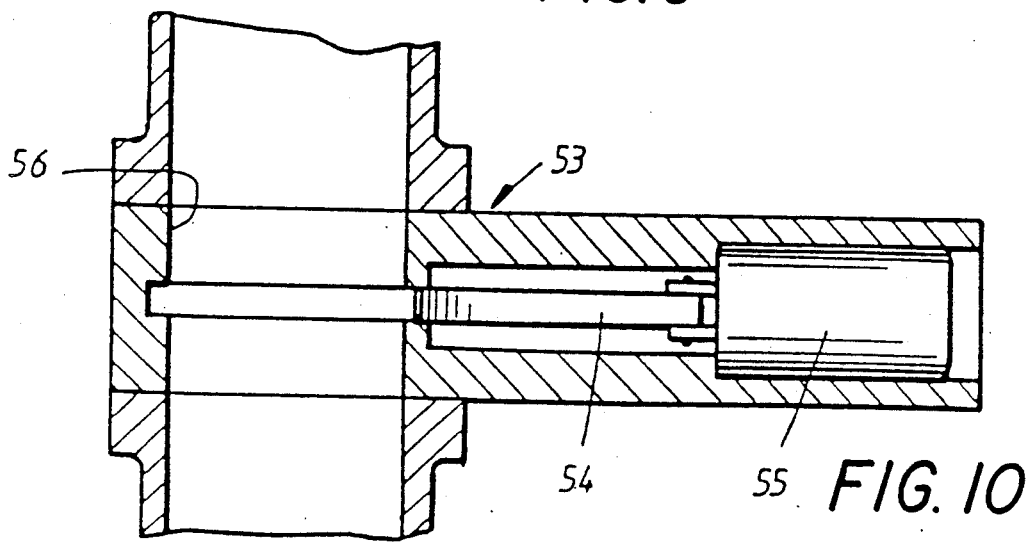
FIG. 10 is a cross-section along A—A of FIG. 9.
Figure 11:
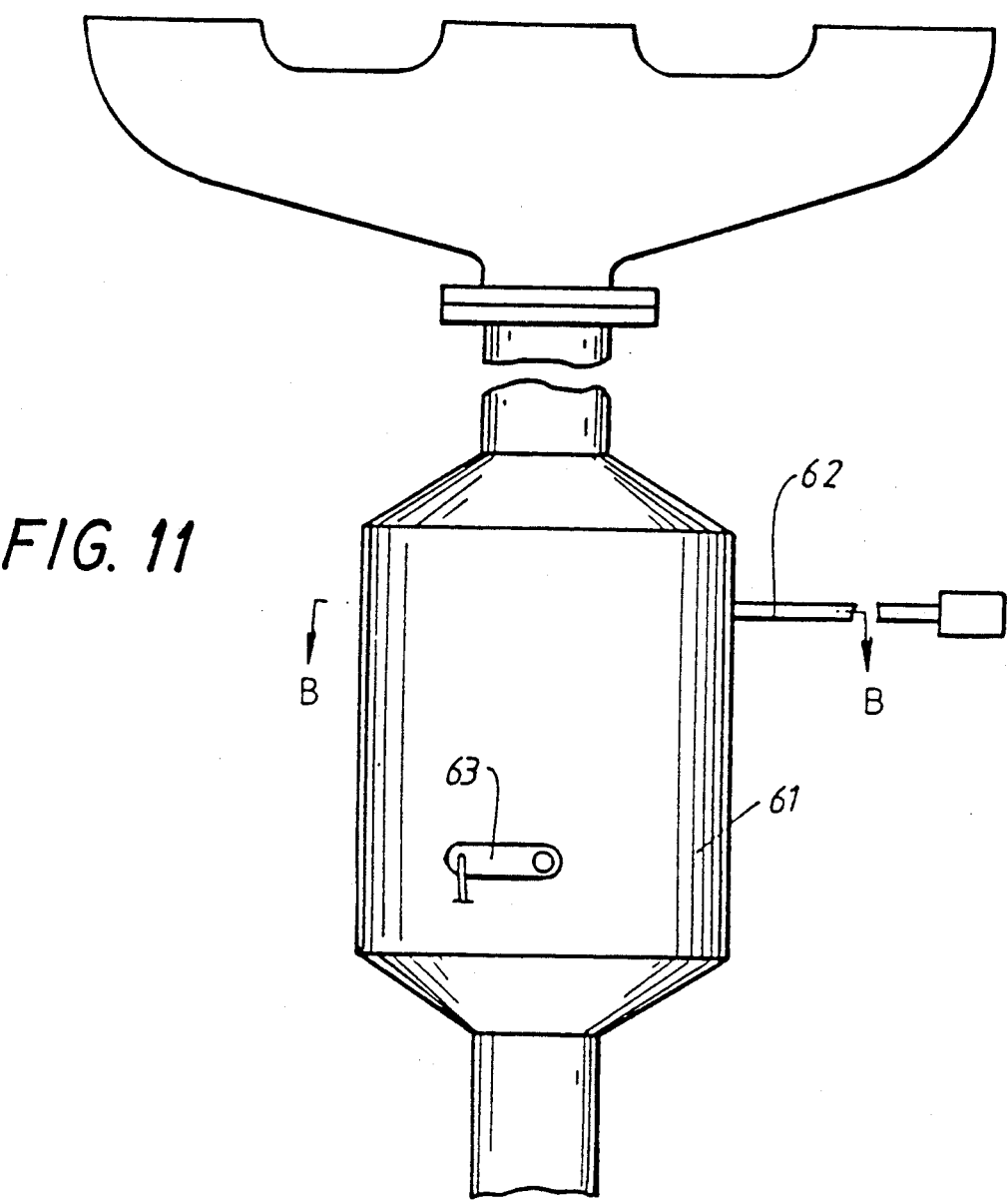
FIG. 11 is a schematic representation of an embodiment of the security device of the invention for installation in an exhaust system.
Figure 12:
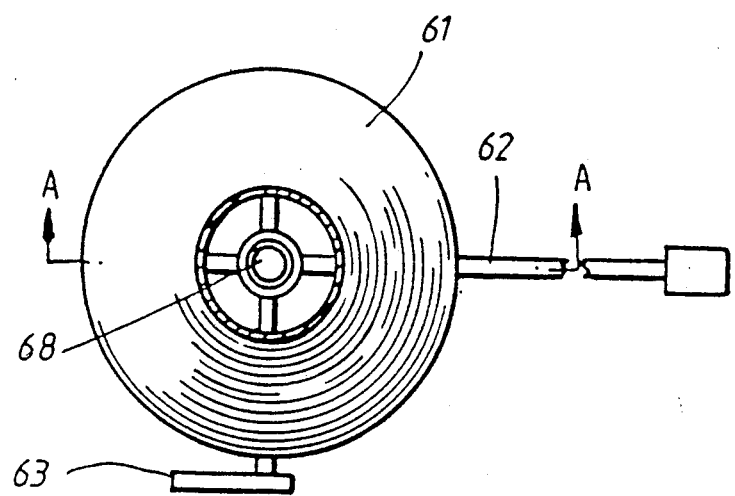
FIG. 12 is a plan view of the device depicted in FIG. 11.
Figure 13:
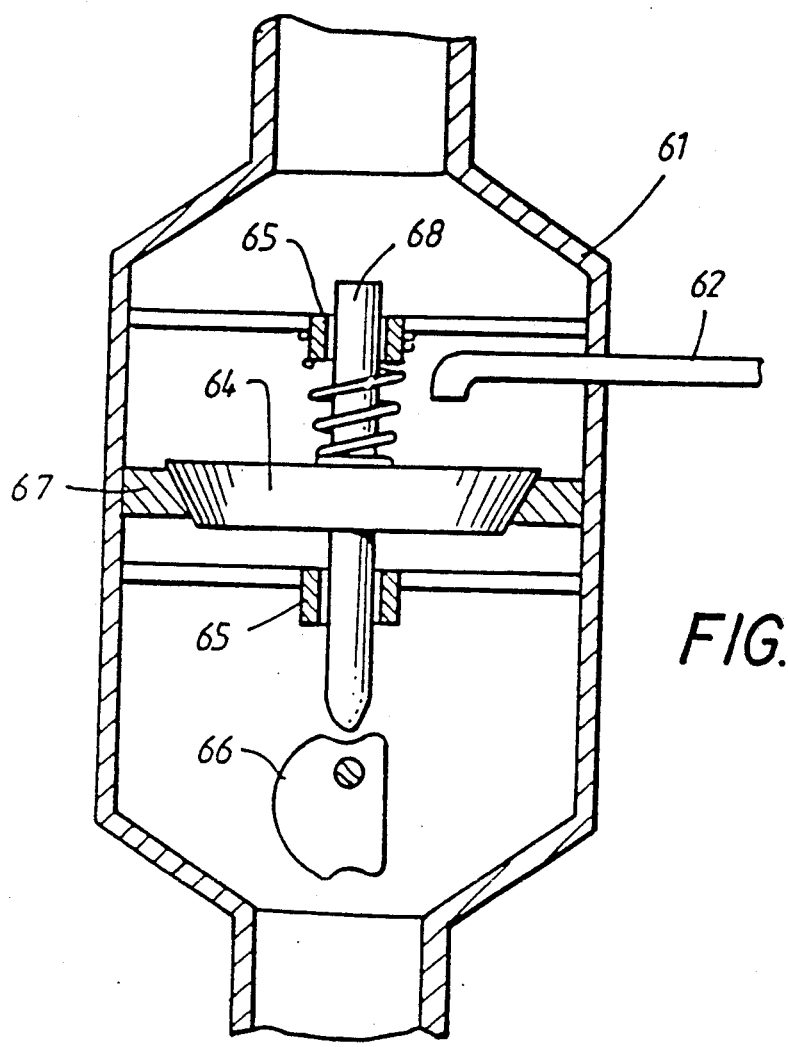
FIG. 13 is a cross-section along line A—A of FIG. 12.
Figure 14:
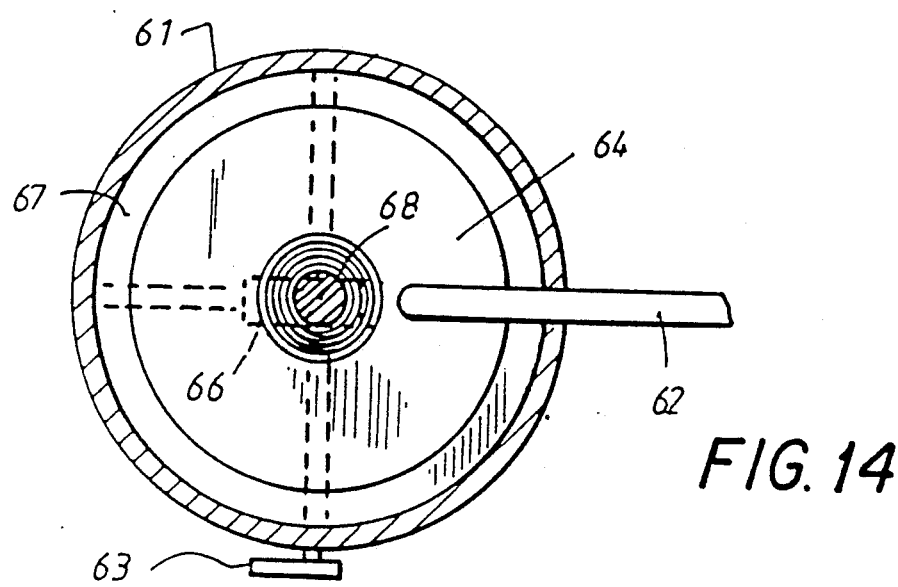
FIG. 14 is a cross-section along line B—B of FIG. 11.

FIGS. 8 to 10 illustrate an embodiment of the invention suitable for installation in the air inlet.

The security device 53 is installed upstream of the manifold 51 as illustrated in FIG. 8. In this embodiment a solenoid 55 is used to operate a shut-off valve 54 to open or close the inlet 56.

FIGS. 11 to 14 illustrate an embodiment of the invention suitable for installation in the exhaust system. The embodiment comprises a housing 61 having an on-off control lever 63 connected to a cam 66 (FIG. 13), a valve member 64 having a valve seat 67, a valve stem 68 guided by a valve guide means 65, a spring for biasing the valve member 64 against the seat 65, and a capillary 62 for taking exhaust gases from the exhaust to operate an alarm such as a whistle. When the device is installed in the exhaust system of a motor vehicle and the vehicle is started while the valve is closed, exhaust gases escape through the capillary 62 and operate the alarm system while at the same time the back pressure in the exhaust system prevents the engine from operating.

I claim:

1. A security device for an internal combustion engine having an exhaust outlet, said device comprising:
    a valve mechanism for the exhaust outlet,
    valve control means for operating the valve mechanism and means for locking the valve control means,
    said valve mechanism having a valve member which is capable when installed and operated of opening and closing the exhaust outlet in which it is installed.

2. A security device according to claim 1, wherein the valve mechanism has a first member having a gate and a second member which is connected to the valve member and is capable of passing through the gate when it is in an open position to cause the valve member to move to an open or closed position but is incapable of passing through the gate when it is in the closed position thereby locking the valve member in an open or closed position, the valve control mechanism being connected to the first and second members such that it is capable of causing the gate of the first member to open or close and the second member to move through the gate when it is open.

3. A security device according to claim 2, wherein the first member comprises a rotatable lever having a head with a skirt depending therefrom, the skirt having a gap therein to define a gateway, the lever being rotatable about an axis and the second member comprises a rotatable lever having a head with a skirt depending therefrom in a direction opposite to the skirt of the second member and rotatable about an axis parallel to the axis of the first member such that when the first member is located with its gate in the open position, the skirt of the second member can pass through the gateway and when the first member is located in the closed position, the skirt of the second member engages the skirt of the first member thereby preventing rotation of the second member.

4. A security device according to claim 3, wherein the valve control mechanism comprises a housing, a rotatable disc attached to one end of an axle, a lockable rotatable control knob attached to the opposite end of the axle, a pair of slidable plates mounted inside the housing, each having one end of a pair of cables secured thereto, the cables being enclosed with sheaths, one end of each of which is secured to the housing, the rotatable disc having two cams depending therefrom on opposite sides thereof and parallel to the axis of rotation, the rotatable disc being mounted between the slidable plates within the housing, each of said plates having one end so shaped that it is capable of co-operating with each of the cams to pull or push the cables, the other ends of each of said cables being attached to an end of the first and second members such that the first and second members may be rotated by rotation of the lockable rotatable control knob.

5. A security device according to claim 4, wherein the lockable rotatable control knob comprises a first cylinder having a central bore within which a second hollow cylinder is mounted which provides a sleeve for a third cylinder mounted therein which, by means of a key operated cam, is rotatable to cause a lug to engage or disengage a co-operating slot within the housing in which the knob is rotatably mounted such that when the lug engages the slot the knob can no longer be rotated and when the lug is disengaged the knob can be rotated within the housing.

6. A security device according to claim 2, wherein the valve control mechanism comprises a key operable electrical switch and the first and second members are operable by solenoid connected to the switch.

7. A security device according to claim 2, wherein the valve mechanism is provided with a means for holding it in the closed position in the event that the valve control means is severed from the valve mechanism.

8. A motor vehicle having a security device according to claim 1.

9. A motor vehicle according to claim 8, in which the valve mechanism is located in the exhaust outlet upstream of a muffler.

10. A motor vehicle according to claim 8, wherein the valve control mechanism includes a lockable device which is capable of rendering the valve control mechanism operable and inoperable, and capable of activating and deactivating an ignition system of the motor vehicle.

* * * * *